(12) United States Patent
Strasser

(10) Patent No.: US 6,557,322 B2
(45) Date of Patent: May 6, 2003

(54) APPARATUS FOR SEALING A WRAPPER FILM SLEEVE

(75) Inventor: Thomas Strasser, Benken (CH)

(73) Assignee: SIG Pack Systems AG, Beringen (CH)

(*) Notice: Subject to any disclaimer, the term of this patent is extended or adjusted under 35 U.S.C. 154(b) by 87 days.

(21) Appl. No.: 09/770,655

(22) Filed: Jan. 29, 2001

(65) Prior Publication Data
US 2001/0010144 A1 Aug. 2, 2001

(30) Foreign Application Priority Data
Jan. 27, 2000 (CH) .............................................. 0162/00

(51) Int. Cl.⁷ .............................................. B65B 51/16
(52) U.S. Cl. ........................................ 53/374.4; 53/550
(58) Field of Search .................. 53/550, 374.4, 53/374.5, 375.4

(56) References Cited

U.S. PATENT DOCUMENTS

| | | | |
|---|---|---|---|
| 4,102,111 A | | 7/1978 | Nack et al. |
| 4,199,919 A | | 4/1980 | Moscatelli |
| 4,455,808 A | | 6/1984 | Netzhammer |
| 4,862,673 A | | 9/1989 | Francioni |
| 5,351,464 A | | 10/1994 | Francioni |
| 5,622,033 A | * | 4/1997 | Fukuda ........................ 53/551 |
| 5,753,067 A | * | 5/1998 | Fukuda et al. .............. 156/358 |
| 6,088,994 A | * | 7/2000 | Nakagawa et al. ........ 53/374.6 |
| 6,178,726 B1 | * | 1/2001 | Takigawa ................... 53/374.6 |
| 6,421,987 B1 | * | 7/2002 | Fukuda ....................... 53/371.6 |

FOREIGN PATENT DOCUMENTS

| | | |
|---|---|---|
| EP | 0 399 948 | 11/1990 |
| EP | 0 560 988 | 9/1993 |
| WO | 96/17720 | 6/1996 |

* cited by examiner

*Primary Examiner*—Rinaldi I. Rada
*Assistant Examiner*—Hemant M. Desai
(74) *Attorney, Agent, or Firm*—Venable LLP.; Robert Kinberg; Chad C. Anderson

(57) ABSTRACT

An apparatus for sealing a wrapper sleeve includes a first peripheral surface rotating about a first axis and having a generatrix parallel to and at a maximum distance from, the first axis and a radius of curvature smaller throughout the circumferential surface length than the maximum distance. A second peripheral surface rotates about a second axis oriented parallel to the first axis. The first and second peripheral surfaces define a line of contact with the wrapper sleeve therebetween. The first and second surfaces rotate in synchronism and roll on one another effecting sealing of the wrapper sleeve as the wrapper sleeve is advanced. A device displaces the first axis relative to the second axis in a direction transverse to the advancing direction of the wrapper sleeve for effecting displacement of the line of contact in the advancing direction as the first and second surfaces rotate.

16 Claims, 5 Drawing Sheets

APPARATUS FOR SEALING A WRAPPER FILM SLEEVE

CROSS REFERENCE TO RELATED APPLICATION

This application claims the priority of Swiss Application No. 2000 0162/00 filed Jan. 27, 2000, which is incorporated herein by reference.

BACKGROUND OF THE INVENTION

In packing machines which package items into wrapper sleeves, first a film sleeve is formed about the items and then the sleeve is longitudinally sealed. In a transverse sealing station transverse seams are formed between the items and subsequently the transverse seams are severed in their center across the sleeve to thus obtain individual packages.

In European Patent No. 399 948 to which corresponds U.S. Pat. No. 5,052,166, a transverse sealing station is described which has facing sealing shoes and counter shoes provided with cylindrical sealing faces and counter faces. The sealing faces are arranged coaxially with and revolve about respective rotary axes. The maximum advancing speed of the sleeve is limited where such transverse sealing stations are used because of the delay in heat transfer from the sealing shoes through the film to the sealing layer.

To take into consideration such a delay, it is further known to provide sealing shoes and counter shoes which, while they rotate, they also co-travel with the wrapper sleeve. Such an arrangement which increases the output of the packing machine, is described, for example, in published International Application WO 96/17720 to which corresponds U.S. Pat. No. 5,771,660. The transverse sealing station described therein is, however, of relatively complex structure and is therefore expensive to manufacture and service. Further, the masses moved back and forth parallel to the conveying direction of the wrapper sleeve cause oscillations which are transmitted to the entire packing machine.

SUMMARY OF THE INVENTION

It is an object of the invention to provide an improved apparatus of the above-outlined type with which a high packing capacity may be achieved with simple structural means.

This object and others to become apparent as the specification progresses, are accomplished by the invention, according to which, briefly stated, the apparatus for sealing a wrapper sleeve includes a first sealing shoe having a first peripheral surface supported for rotation about a first axis. The first peripheral surface has a generatrix being parallel to and at a maximum distance from, the first axis and a radius of curvature which is smaller at any point of the circumferential length of the first peripheral surface than the maximum distance. A second sealing shoe, having a second peripheral surface is supported for rotation about a second axis oriented parallel to the first axis. The first and second peripheral surfaces together define a line of contact with one another with the wrapper sleeve interposed therebetween. The first and second sealing shoes rotate in synchronism whereby the first and second peripheral surfaces roll on one another effecting sealing of the wrapper sleeve as the wrapper sleeve is advanced. A device displaces the first axis relative to the second axis in a direction transverse to the advancing direction of the wrapper sleeve for effecting displacement of the line of contact in the advancing direction as the first and second sealing shoes rotate.

BRIEF DESCRIPTION OF THE DRAWING

FIG. 4 is a diagram illustrating the mode of operation of the invention.

DESCRIPTION OF THE PREFERRED EMBODIMENTS

Figure 1:
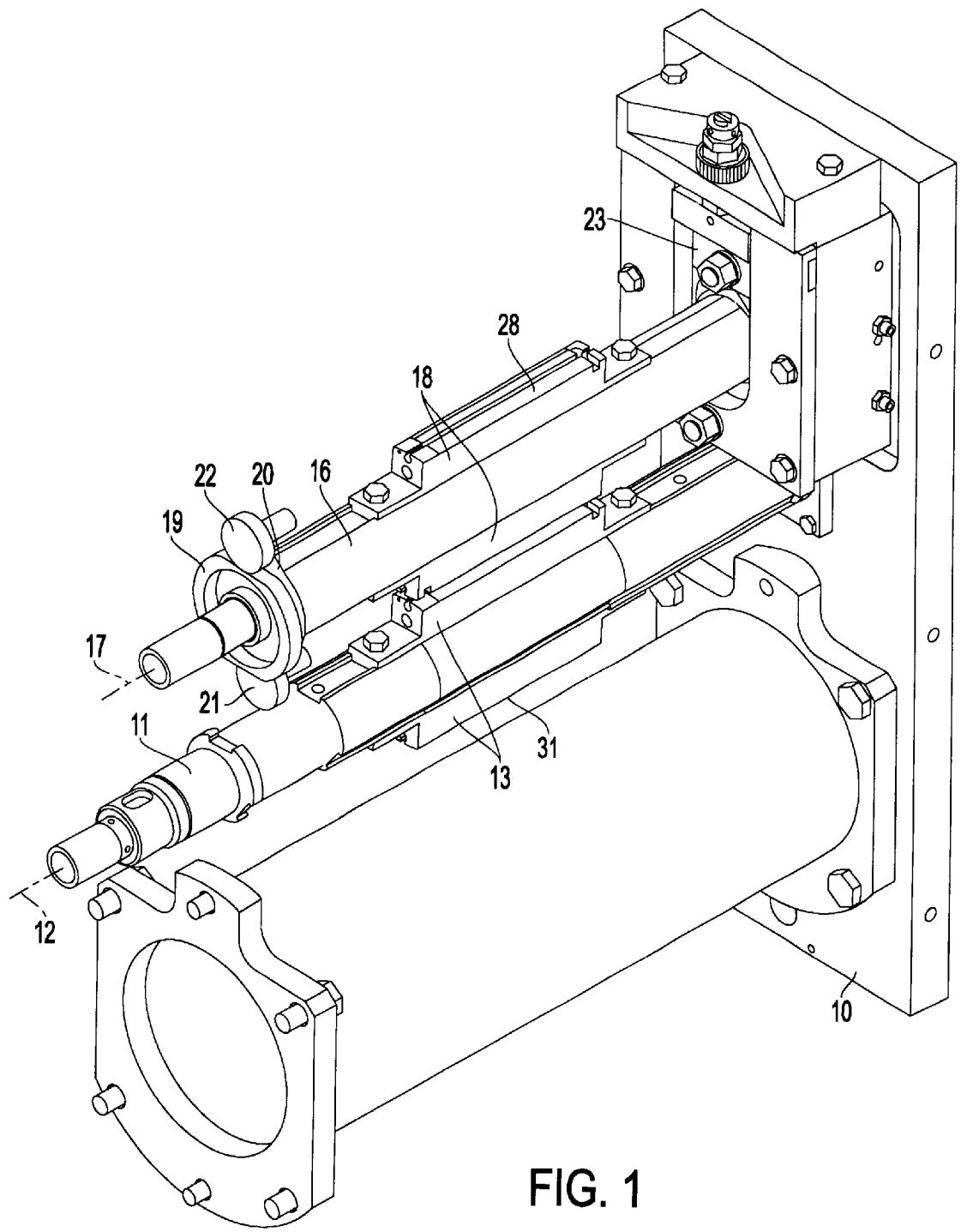
FIG. 1 is a perspective view of one part of a transverse sealing apparatus according to a preferred embodiment of the invention.
Figure 2:
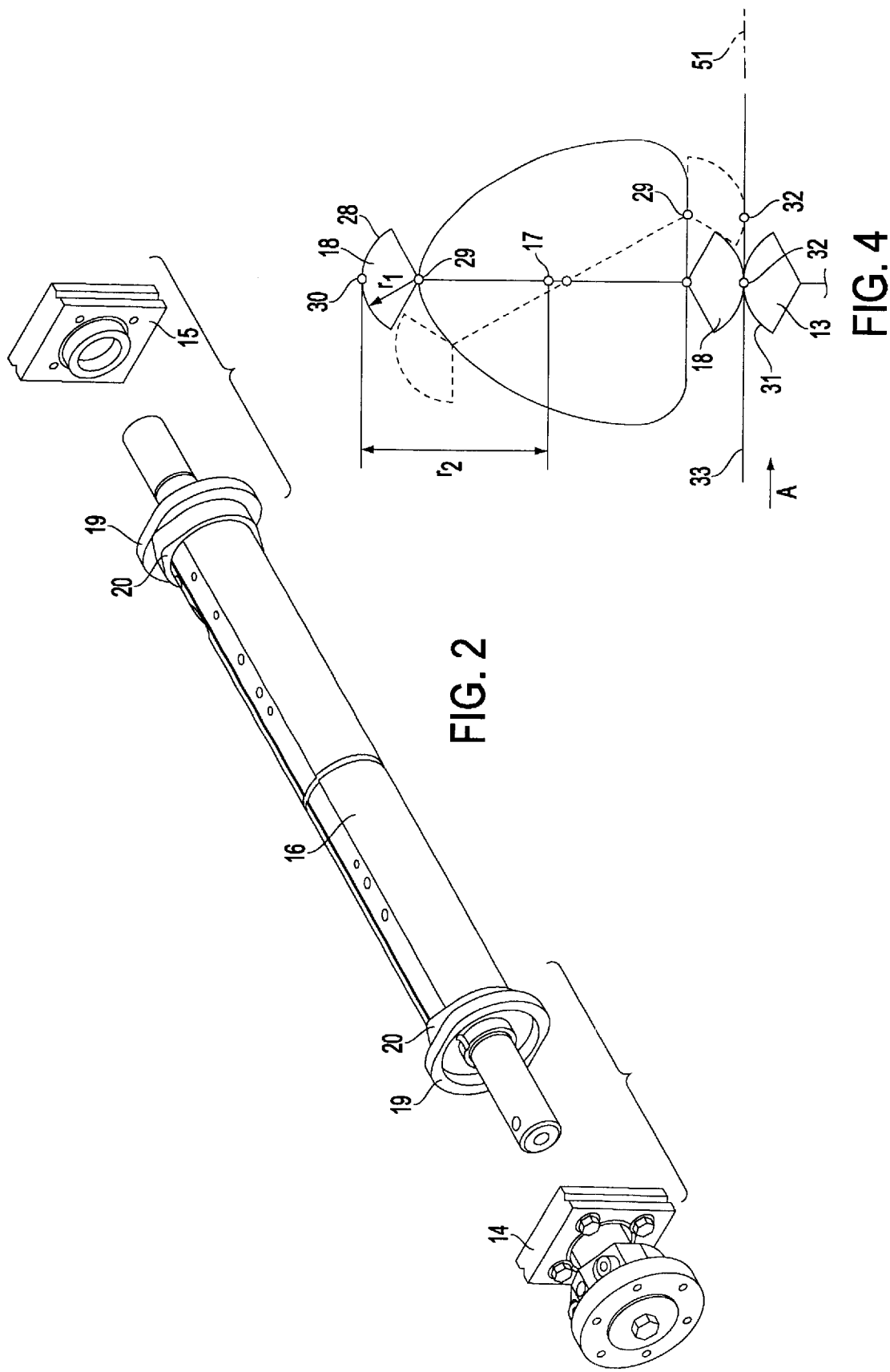
FIG. 2 is a perspective view of a vertically movable shaft of one of the sealing shoes of the apparatus according to the invention.
Figure 3:
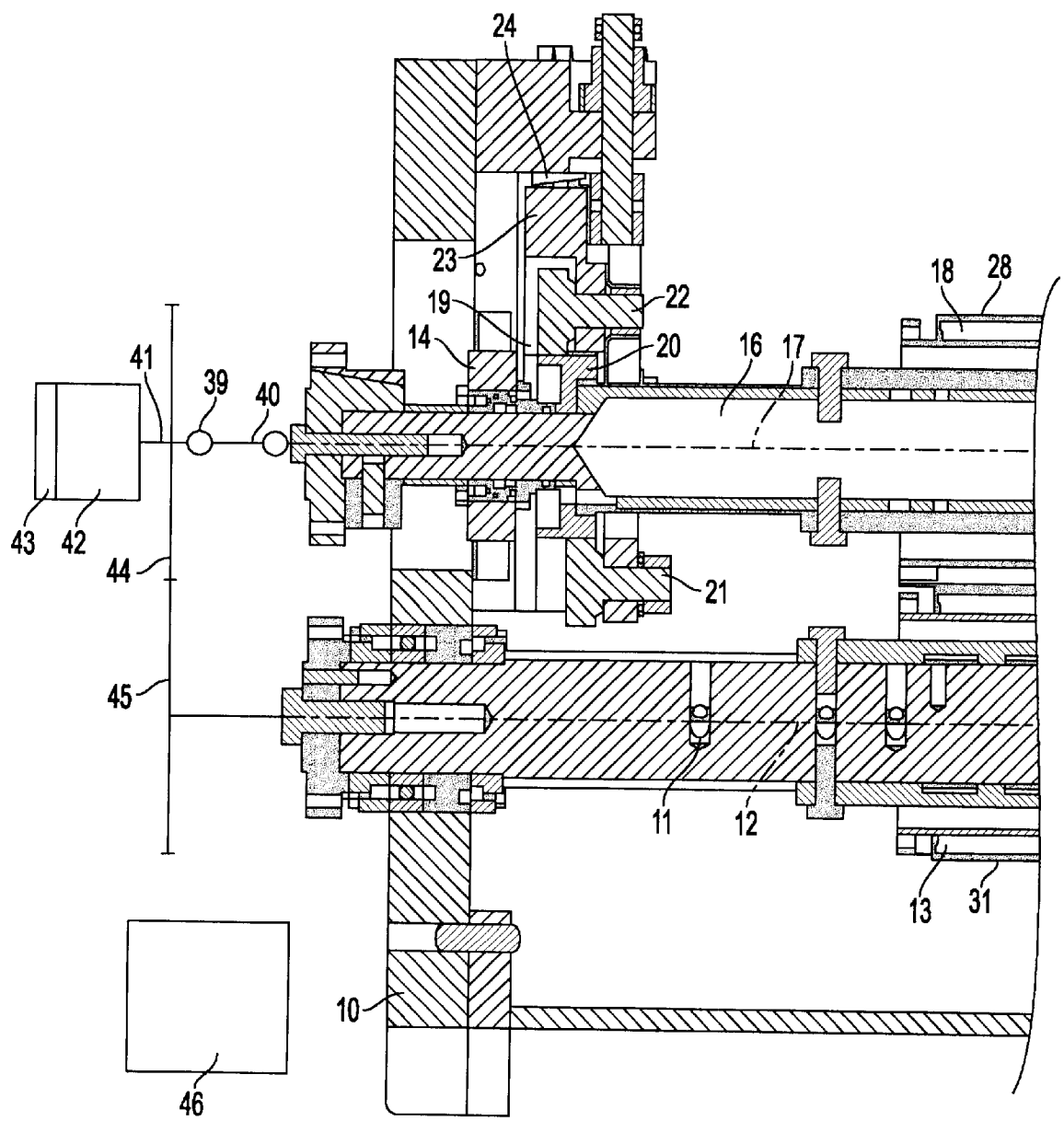
FIG. 3 is a sectional elevational view of the construction shown in FIG. 1.
Figure 5D:
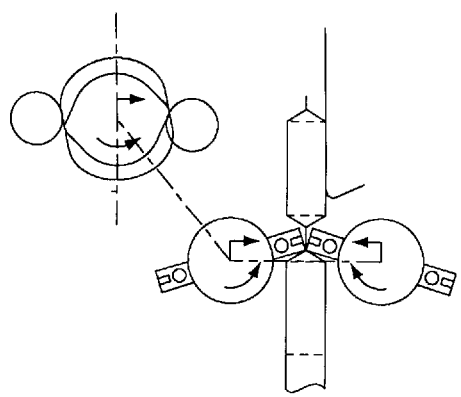
FIGS. 5a–5d are schematic side elevational views illustrating different sequential operating positions.
Figure 5C:
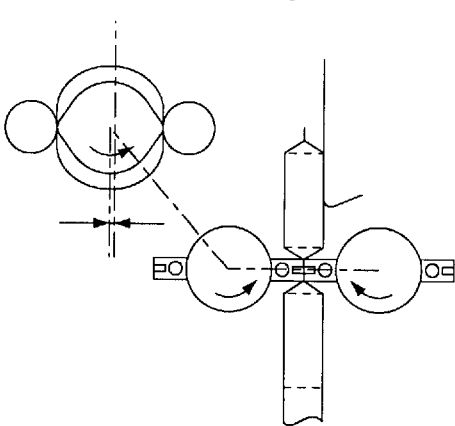
Figure 5B:
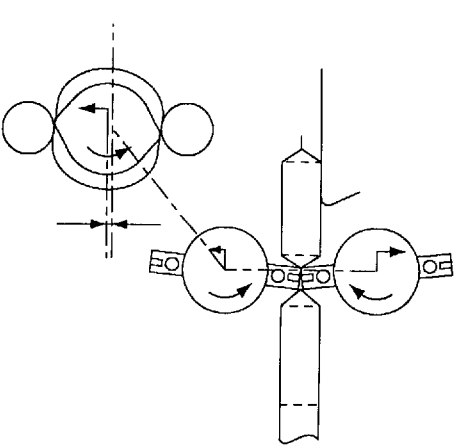
Figure 5A:
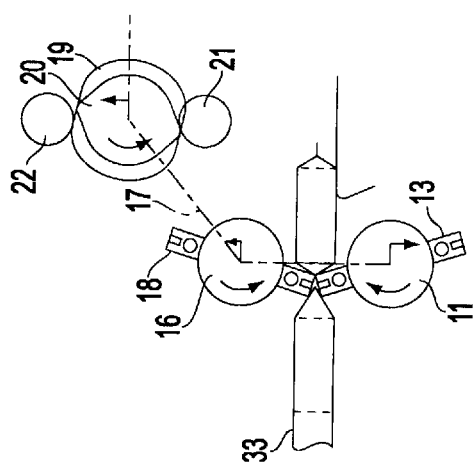

FIGS. 1, 2 and 3 illustrate an apparatus including a housing 10 in which a shaft 11 is supported for rotation about an axis 12. Two sealing shoes 13 are mounted on the shaft 11 in a diametrically opposite relationship. Also referring to FIG. 4, in the housing 10 two sleds 14, 15 are guided for vertical motion, that is, for motion transversely to the conveying direction A of a wrapper sleeve 33. A shaft 16 is mounted on the sleds 14, 15 for rotation about an axis 17 which is parallel to the axis 12. Two further sealing shoes 18 are secured to the shaft 16 in a diametrically opposite relationship. To each opposite axial end of the shaft 16 two cam disks 19, 20 are secured. The cam disk 20 rolls on a roller 21 affixed to the housing 10, and the cam disk 19, in turn, runs on a roller 22 which is rotatably mounted in a further sled 23 displaceable vertically in the housing 10. The two sleds 23 (at opposite axial ends of the shaft 16) are biased downwardly by springs 24 against the rollers 21.

As shown in FIG. 4, the peripheral surfaces 31 and 28 of the respective sealing shoes 13 and 18 are cylindrical; in the shown example the cylindrical surface is circular. The peripheral surface 28 is shown to have a cylinder axis 29 situated between the generatrix 30 of the peripheral surface 28 of the sealing shoe 18 and the axis 17 of the shaft 16 and is parallel thereto. Preferably, the radius of curvature $r_1$ of the peripheral surface 28 is at the most one-half the distance $r_2$ of the generatrix 30 from the rotary axis 17. The cross-sectional outline of the cylindrical peripheral surface 28 may be other than circular; it may be, for example, elliptical. In any event, the radius of curvature $r_1$ of the peripheral surface 28 is less than $r_2$ along the entire, circumferential length of the peripheral surface 28. The same relationships are applicable to the peripheral surface 31 of the sealing shoe 13.

The cam disks 19, 20 associated with the shaft 16 are configured such that the axis 17, during the rotary motion of the shaft 16 and during the sealing process, executes a synchronous vertical motion illustrated in FIGS. 4 and 5a–5d. This motion proceeds in such a manner that the peripheral surface 28 of the sealing shoe 18 is pressed against the corresponding peripheral surface 31 of the sealing shoe 13. As also seen in FIG. 4, during such an occurrence, the contact line 32 between the two contacting sealing shoes 18, 13 shifts during the sealing process in the conveying direction A of the wrapper sleeve 33. As a result, a longer sealing period is achieved, or for the same sealing period a greater transporting speed of the wrapper sleeve 33 is obtained as compared to conventional sealing shoes whose radius of curvature corresponds to the distance $r_2$.

The minimal vertical motion of the sealing shoe 18 causes only very small vibrations and no vibrations at all in the conveying direction A in contrast to conventional transverse sealing shoes which, during their rotation, linearly co-travel with the wrapper sleeve in the conveying direction. Vibrations in the conveying direction A are particularly undesirable because they may adversely affect the regular distance between the products to be packaged. The apparatus according to the invention needs only a small number of individual components and is therefore economical to manufacture and service. By virtue of the resiliently supported rollers 22, no play (clearance) appears in the vertical direction. In order to further minimize the forces derived from mass, the vertically moved shaft 16 is of hollow construction. It is to be understood that the described apparatus is adapted not only for horizontal but also for vertical packing machines operating with wrapper film sleeves.

FIG. 4 illustrates the variant in which the two shafts 11, 16 are moved vertically in synchronism towards and away from one another. Accordingly, the contact line 32 progresses in a plane. Thus, in this variant the shaft 11 (not shown in FIG. 4) is also movable in a vertical direction by being mounted at its ends on two respective sleds and by being positively guided by further cam disks which correspond to the cam disks 19 and 20. Likewise, rollers which correspond to the rollers 21, 22 are provided to engage the cam disks of the shaft 11. The support of the shaft 11 is in mirror symmetry with the support of the shaft 16 by means of elements 14, 15 and 19–24 with respect to the central vertical plane 51 of the two axes 12, 17. In contrast, in the variant shown in FIGS. 1, 2 and 3 in which the shaft 11 is fixedly supported by the housing 10, the travelling path of the contact line 32 is slightly cylindrical.

Figure 6C:
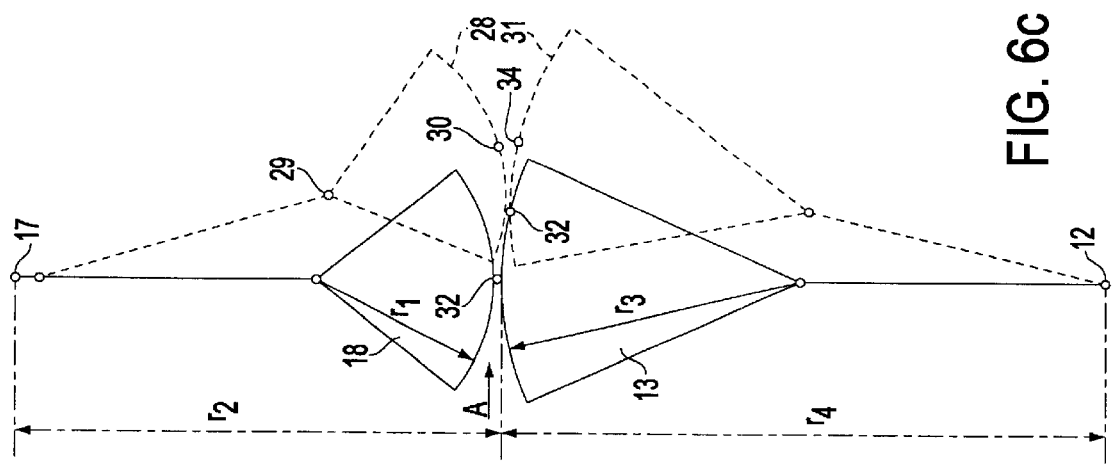
FIGS. 6a, 6b and 6c show diagrams illustrating the peripheral configuration of three variants.
Figure 6B:
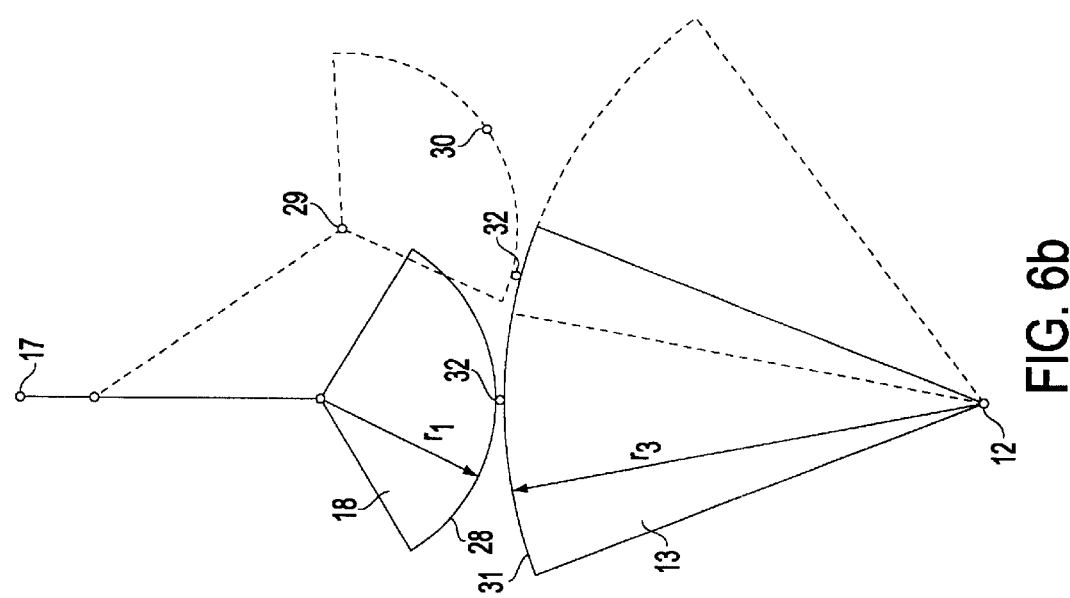
Figure 6A:
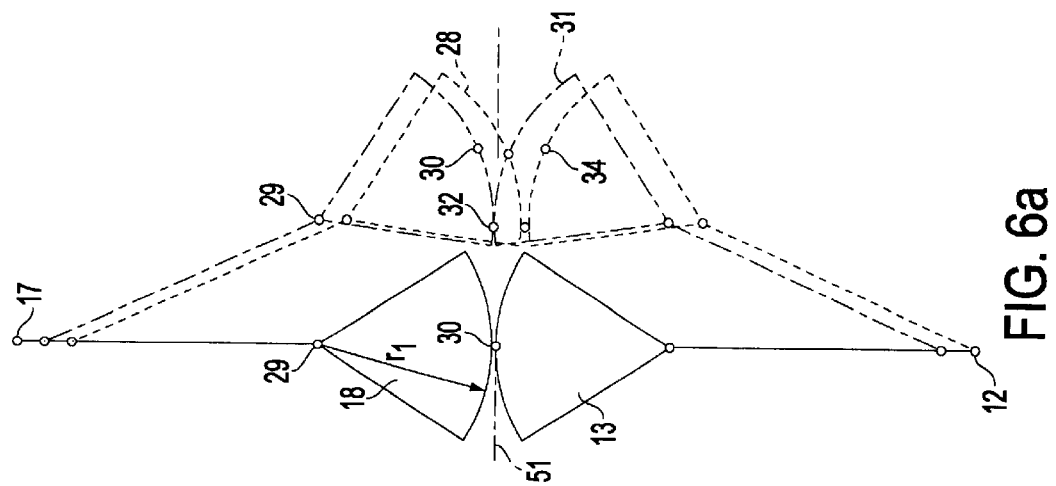

FIGS. 6a, 6b and 6c show variants of the peripheral surfaces 28, 31 of the sealing shoes 13, 18. FIG. 6a corresponds to the illustration in FIG. 4 where the outwardly swung position of the sealing shoes 13, 18 shown in dash-dotted lines corresponds to the variant in which both axes 12, 17 are moved back and forth with respect to the central vertical plane 51. The position shown in dashed lines corresponds, in turn, to the variant in which the axis 12 is stationary. The first-noted variant has the advantage that vertical oscillations too, are not transmitted to the housing 10 if the moved masses of the shafts 11, 12 are identical because these shafts oscillate precisely in counter phase. The second variant, in turn, has the advantage that it is of simpler construction.

FIG. 6b shows a variant in which the axis 12 is stationary and the circular-cylindrical peripheral surface 31 is coaxial with the axis 12. As seen, this variant requires longer peripheral surfaces 28, 31 in the circumferential direction for the same maximum displacement in the conveying direction A of the contact line 32. The symmetrical variant according to FIG. 6a is therefore preferable over the FIG. 6b variant.

FIG. 6c shows a more general variant in which the radii of curvature $r_1$ and $r_3$ of the peripheral surfaces 28, 31 of the sealing shoes 13, 18 as well as the distances $r_2$ and $r_4$ of the generatrices 30, 34 of the peripheral surfaces 28, 31 are different from the axes 12 and 17 of the peripheries 28, 31. For example, it is feasible to select $r_4$ to be one and a half times $r_2$ and to arrange on the shaft 11 three, rather than two sealing shoes 13 in a uniform circumferential distribution. The transmission ratio of the drive 44, 45 is therefore adapted to such a structure or two separately controlled servomotors 42 may be provided which are coupled to the respective shafts 11, 16.

According to FIG. 3, the shaft 16 is connected by means of two cardan joints 39 and a cardan shaft 40 with a drive shaft 41 of a servomotor 42 and is also coupled to an angular displacement sensor 43. The shaft 41 is connected via two gears 44, 45 of identical size with the shaft 11. The motor 42 and the sensor 43 are connected with a control device 46 which synchronizes the rotary angle of the shafts 11, 16 with the feed of the wrapper sleeve 33. The angular velocity of the shafts 11, 16 is regulated such that the component of the circumferential speed of the peripheral surface 28 in the advancing direction A during sealing equals the conveying speed of the wrapper sleeve 33.

It will be understood that the above description of the present invention is susceptible to various modifications, changes and adaptations, and the same are intended to be comprehended within the meaning and range of equivalents of the appended claims.

What is claimed is:

1. An apparatus for sealing a wrapper sleeve transversely to an advancing direction thereof, comprising
   (a) a first sealing shoe supported for rotation about a first axis; said first sealing shoe including a first curved peripheral surface having
      a generatrix being parallel to and at a maximum distance from said first axis; and
      a radius of curvature being smaller than said maximum distance;
   (b) a second sealing shoe supported for rotation about a second axis oriented parallel to said first axis; said second sealing shoe including a second curved peripheral surface; said first and second peripheral surfaces together defining a line of contact with one another with the wrapper sleeve interposed therebetween;
   (c) means for rotating said first and second sealing shoes in synchronism for causing said first and second peripheral surfaces to roll on one another effecting sealing of the wrapper sleeve as the wrapper sleeve moves in the advancing direction; and
   (d) a device for displacing said first axis relative to said second axis in a direction transverse to said advancing direction of the wrapper sleeve for effecting displacement of said line of contract relative to said peripheral surfaces of said sealing shoes in said advancing direction as said first and second sealing shoes rotate.

2. The apparatus defined in claim 1, wherein said radius of curvature is at the most half of said maximum distance.

3. The apparatus as defined in claim 1, further comprising a first drive shaft having a rotary axis constituted by said first axis; there being provided a plurality of said first sealing shoes affixed to said first shaft in a uniform circumferential distribution; and a second drive shaft having a rotary axis constituted by said second axis; there being provided a plurality of said second sealing shoes affixed to said second shaft in a uniform circumferential distribution.

4. The apparatus as defined in claim 1, wherein said means for rotating said first and second sealing shoes comprises a servomotor; further comprising a control apparatus for controlling an angle of rotation of said first and second sealing shoes such that during an entire sealing step a component of the circumferential velocity of said first and second peripheral surfaces measured in said advancing direction at least approximately equals the advancing speed of the wrapper sleeve.

5. The apparatus as defined in claim 1, wherein said generatrix, said maximum distance and said radius of curvature is, respectively, a first genertatrix, a first maximum distance and a first radius of curvature; further wherein said second peripheral surface has a second generatrix being parallel to and at a second maximum distance from said second axis; and a second radius of curvature being smaller than said second maximum distance.

6. The apparatus as defined in claim 5, wherein said first and second peripheral surfaces are circularly cylindrical.

7. The apparatus as defined in claim 5, wherein said first and second maximum distances are equal to one another.

8. The apparatus as defined in claim 5, wherein said first peripheral surface is symmetrical to a plane containing said first generatrix and said first axis and said second peripheral surface is symmetrical to a plane containing said second generatrix and said second axis.

9. The apparatus as defined in claim 8, wherein said first and second peripheral surfaces are in mirror symmetry to one another relative to a plane in which the wrapper sleeve is advanced.

10. The apparatus as defined in claim 1, wherein said device comprises control means for displacing said first axis transversely to said advancing direction in synchronism with an angle of rotation of said first and second sealing shoes.

11. The apparatus as defined in claim 10, wherein said control means comprises a cam disk drive.

12. The apparatus as defined in claim 11, wherein said cam disk drive comprises first and second separate, commonly driven cam disks for displacing said first axis toward and, respectively, away from said second axis.

13. The apparatus as defined in claim 12, further comprising (a) a drive shaft having a rotary axis constituted by said first axis; said first sealing shoe, said first cam disk and second cam disk being affixed to said drive shaft;

(b) a first, stationarily supported roller being in rolling engagement with said first cam disk;

(c) a second roller being in engagement with said second cam disk; said second roller being displaceable parallel to a plane containing said first and second axes; and (d) pressing means for biasing said second roller toward said second cam disk.

14. The apparatus as defined in claim 13, further comprising a housing and a first sled, the first sled being displaceable laterally in said housing and said second roller being rotatably mounted on said first sled, wherein said first sled is biased against said first roller.

15. The apparatus as defined in claim 14, further comprising a third and a fourth cam disk being affixed to a first axial end of said drive shaft, a third roller being in rolling engagement with said third cam disk, a fourth roller being in rolling engagement with said fourth cam disk and a second sled being displaceable laterally in said housing, wherein said first and said second cam disk are affixed on a first end of said drive shaft and said third and fourth cam disk are affixed on second end of said drive shaft and wherein said fourth roller is rotatably mounted on said second sled, wherein said second sled is biased against said third roller.

16. The apparatus as defined in claim 1, further comprising a device for displacing said second axis relative to said first axis in a direction transverse to said advancing direction of the wrapper sleeve.

* * * * *